United States Patent [19]
Makita et al.

[11] Patent Number: 5,289,315
[45] Date of Patent: Feb. 22, 1994

[54] HEAD-UP DISPLAY SYSTEM INCLUDING A UNIFORMLY REFLECTING LAYER AND A SELECTIVELY REFLECTING LAYER

[75] Inventors: Kensuke Makita; Katsuto Tanaka; Atsushi Takamatsu, all of Mie Prefecture, Japan

[73] Assignee: Central Glass Company, Limited, Ube, Japan

[21] Appl. No.: 872,027

[22] Filed: Apr. 23, 1992

[30] Foreign Application Priority Data

May 29, 1991 [JP] Japan ............... 3-039448[U]

[51] Int. Cl.$^5$ .................. G02B 27/14; G02B 5/28; G02B 1/10
[52] U.S. Cl. .................. 359/634; 359/589; 359/583; 428/428; 428/432
[58] Field of Search ............... 359/634, 630, 629, 589, 359/583; 428/428, 432

[56] References Cited

U.S. PATENT DOCUMENTS

| | | | |
|---|---|---|---|
| 2,907,672 | 10/1959 | Irland et al. | 359/634 |
| 3,899,241 | 8/1975 | Malobicky et al. | 359/630 |
| 4,560,233 | 12/1985 | Banbury | 359/630 |
| 5,005,009 | 2/1991 | Roberts | 359/630 |
| 5,066,102 | 11/1991 | Hirano | 359/630 |
| 5,128,659 | 7/1992 | Roberts et al. | 359/630 |
| 5,194,989 | 3/1993 | Ferrante et al. | 359/634 |

FOREIGN PATENT DOCUMENTS 53-38852 10/1978 Japan .
60-154226 8/1985 Japan .

Primary Examiner—Jon W. Henry
Attorney, Agent, or Firm—Keck, Mahin & Cate

[57] ABSTRACT

The present invention relates to a head-up display system which includes an element thereof. The element is attached to, for example, an automobile windshield so as to project light rays carrying images of display information onto the element from a luminous source in a car. The element includes first and second reflection layers. The first layer is directly attached to the windshield and has a relatively uniform reflectance throughout visible light spectrum. The second layer is directly formed on the first layer and has a selective reflection against incident visible light of wavelengths in the range from about 500 nm to about 600 nm. Thus, the light rays from the luminous source are displayed on the first and second layers in different colors.

10 Claims, 1 Drawing Sheet

HEAD-UP DISPLAY SYSTEM INCLUDING A UNIFORMLY REFLECTING LAYER AND A SELECTIVELY REFLECTING LAYER

BACKGROUND OF THE INVENTION

1. Field of the Invention

The present invention relates in general to a head-up display system which includes a reflection film onto which light rays carrying images of display information are to be projected from a luminous image source, and more particularly relates to a so-called multicolor head-up display system which includes the reflection film on which a plurality of colors are displayed.

2. Description of the Prior Art

Head-up display systems are already in practical use in aircraft cockpits. Recently efforts have been directed to the development of head-up display systems for automobiles. The systems allow the driver of a car to view a vehicular information of an instrument panel, while looking out a front windshield of the car, by projecting an image of the instrument panel in the direction of the front windshield. For example, JP-B (Patent) 53-38852 discloses a head-up display system in which vehicular speed is displayed by an image of transverse line of which length is a function of the speed.

However, there is a recent demand to display other vehicular informations in addition to vehicular speed in different colors. For this purpose, for example, JP-A (Patent) 60-154226 discloses a so-called multicolor head-up display system which includes a transparent reflection film. A plurality of images of vehicular information are displayed in different colors on the reflection film. The images are projected by projectors onto the reflection film with specific different incident angles, such that each reflected light from the reflection film has a certain specific spectrum and a certain specific color. However, it is difficult or troublesome to finely set the incident lights at certain desired angles so as to obtain desired colors.

SUMMARY OF THE INVENTION

It is therefore an object of the present invention to provide an improved head-up display system in which desired colors are easily displayed.

It is another object of the present invention to provide an improved head-up display system in which warning informations are more markedly displayed than non-warning informations are.

According to the present invention, there is provided a head-up display system including an element formed on a transparent substrate for projecting light rays carrying images of display information onto the element from a luminous image source, the element including: a first reflection layer which is directly attached to the transparent substrate and onto which the light rays are to be projected, the first reflection layer having a certain reflection characteristic in terms of wavelength of the light rays so as to display the images in a certain color; and a second reflection layer which is directly formed on the first reflection layer and onto which the light rays are to be projected, the second reflection layer having another certain reflection characteristic in terms of wavelength of the light rays so as to display the images in another certain color.

DESCRIPTION OF THE PREFERRED EMBODIMENTS

Figure 1:
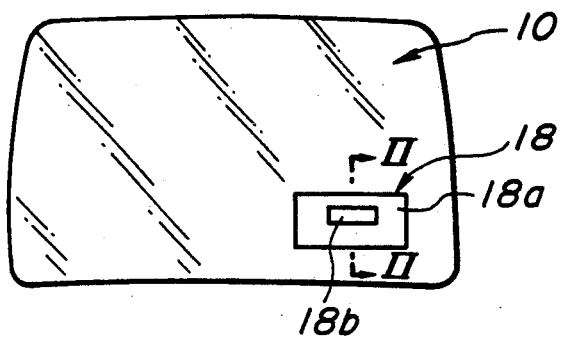
FIG. 1 is a plan view of a front windshield of an automobile, on which a combiner of a head-up display system according to the present invention is installed.
Figure 2:
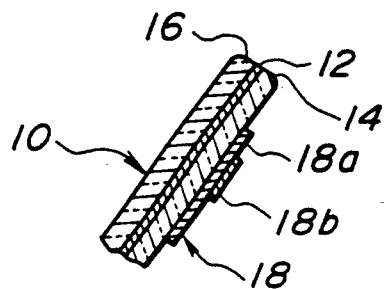
FIG. 2 is a sectional enlarged view which is taken along the line II—II of FIG. 1.

Referring to FIGS. 1 and 2, there is provided a combiner of a head-up display system according to the present invention. The combiner is installed on a right lower corner portion of the inboard surface of a front windshield of an automobile. A laminated glass pane 10 is used as the windshield. The laminated glass pane 10 is made by sandwiching a transparent plastic interlayer 12 between two transparent glass sheets 14 and 16.

The laminated glass pane 10 which is shown in FIGS. 1 and 2 is merely by way of example. Alternatively a pane of a glass sheet can be employed, and it is also optional to apply the present invention to an insulated glass panel. The present invention is always applied to a transparent glass pane, but the glass pane is not necessarily colorless. The glass pane may use a color glass such as bluish, greenish, grayish, bronzy or golden glass, and the color glass may be an ultraviolet and/or infrared absorbing glass. It is optional to use a tempered or partly tempered glass sheet. It is also possible to use an organic glass. Irrespective of the type of the glass, either of a flat glass pane or a curved glass pane can be used.

A reflection coating 18 is used as the combiner of the headup display system for displaying thereon vehicular informations. The reflection coating 18 is made up of a first oxide layer 18a formed directly on the inboard surface of the glass sheet 14 and a second oxide layer 18b laid on the first oxide layer 18a. The combiner is transparent or semi-transparent and has a transmittance of visible light not smaller than 70%. Reflectance of the first oxide layer 18a is relatively nonselective with respect to wavelength of incident visible light. That is, the first oxide layer 18a has a relatively uniform reflectance throughout the visible light spectrum.

In contrast, incident visible light of wavelengths in the range from about 500 nm to about 600 nm is selectively reflected by the second layer. That is, reflectance of incident light of the above wavelength range is higher than that below about 500 nm and than that above about 600 nm wavelength. Furthermore, with respect to incident light of the above wavelength range, reflectance of the second oxide layer 18b is higher than that of the first oxide layer 18a. Photopic vision by cone receptors of human eyes which is capable of recognizing color is most sensitive to light of about 555 nm which is in the middle of above wavelength range. Thus, for example, if incident light which is substantially made up of above wavelength range is projected onto the reflection coating 18, color displayed on the second oxide layer 18b is more markedly recognized by a driver than that displayed on the the first oxide layer 18a is. Therefore, for example, it is possible to project incident light of the above wavelength range which carries so-called warning informations onto the second oxide layer 18b, and to project the incident light which carries so-called non-warning informations onto the first oxide layer 18a. With this, the warning informations are more markedly recognized by the driver than the non-warning informations are.

As to the material of the reflection coating 18, for example, a mixture of $TiO_2$ and $SiO_2$, or a mixture of $ZrO_2$ and $SiO_2$ is used.

It is usual that the second oxide layer 18b is larger than the first oxide layer 18a in thickness.

It is optional to provide a plurality of second oxide layers 18b to be directly attached to the first oxide layer 18a, which are the same or different from each other in wavelength selectivity with respect to reflectance thereof, thereby allowing the reflection coating 18 to display vehicular informations in a plurality of colors.

It is optional to dispose another conventional wavelength-selective oxide layer so as to be positioned away from the reflection coating 18 of the present invention.

It is usual to prepare the material of the reflection coating 18 by the sol-gel method using an alkoxide solution, and to form the reflection coating 18 on the glass sheet 14 by a so-called dip-coating method, a so-called spin-coating method, or the like.

In addition to the front windshield of the automobile, it is optional to apply the present invention to a display in a building window or in a showcase window, etc.

The present invention is further illustrated by the following nonlimitative examples.

EXAMPLE 1

Referring to FIGS. 1 and 2, in accordance with the present invention, a method of preparing the material of the reflection coating 18, a so-called dip-coating method of forming the reflection coating 18 on the transparent glass sheet 14, and a method of producing the laminated glass pane 10 will be described in the following.

First, a first alkoxide solution was prepared by mixing titanium methoxide and silicon methoxide in the proportion of 70 to 30 by mol, and by dissolving the mixture in an alcohol. In this first alkoxide solution, the concentration of the total methoxide was adjusted to about 0.3 mol/l, and the viscosity of the first alkoxide solution was adjusted to about 2 cP.

Then, a second alkoxide solution was prepared by mixing titanium methoxide and silicon methoxide in the proportion of 80 to 20 by mol, and by dissolving the mixture in alcohol. In this second alkoxide solution, the concentration of the total methoxide was adjusted to about 0.5 mol/l, and the viscosity of the second alkoxide solution was adjusted to about 7 cP.

A part of the glass sheet 14 which is a clear glass of 2 mm thickness was covered with masking tape so as to leave the part uncoated with the first alkoxide solution. Then, the glass sheet 14 was immersed in the first alkoxide solution and drawn up from the first solution at a rate of about 3 mm/sec., such that only a right lower corner portion of the glass sheet 14 was coated with the first alkoxide sol film, as illustrated in FIG. 1. Then, the masking tape was removed, and the glass sheet 14 was heated at a temperature of about 250° C. in a furnace for about 5 min so as to convert the first alkoxide sol film into a first gel film.

Then, the above-mentioned uncoated part of the glass sheet 14 and a major part of the first gel film were covered with masking tape again. The glass sheet 14 was immersed in the second alkoxide solution, and drawn up from the second alkoxide solution at a rate of about 5.5 mm/sec., such that the first gel film was partially coated with the second alkoxide sol film. Then the masking tape was removed, and the glass sheet 14 was heated at a temperature of about 250° C. in the furnace for about 5 min so as to convert the second alkoxide sol film into a second gel film. Then, the glass sheet 14 was placed in the furnace and bent into a predetermined curved shape at a temperature of about 620° C. for about 10 min. By this heating for bending, the laminate of two gel films on the inboard surface of the glass sheet 14 turned into a laminate of two dense and oxide films, viz., the first and second oxide layers 18a and 18b in FIGS. 1 and 2. By the usual laminating operation using a polyvinyl butyral film having a thickness of 0.76 mm as the interlayer 12, the coated and bent glass sheet 14 was laminated with a bronzy transparent and similarly bent glass sheet 16 having a thickness of 2.3 mm to obtain the laminated glass pane 10 having thereon the reflection coating 18.

In this example, the thus obtained first layer 18a of the reflection coating 18 was a $TiO_2$-$SiO_2$ mixed oxide film which was about 60 nm in thickness and had a refractive index of about 1.90. The thus obtained second layer 18b of the reflection coating 18 was a $TiO_2$-$SiO_2$ mixed oxide film which was about 160 nm in thickness and had a refractive index of about 2.05.

Figure 3:
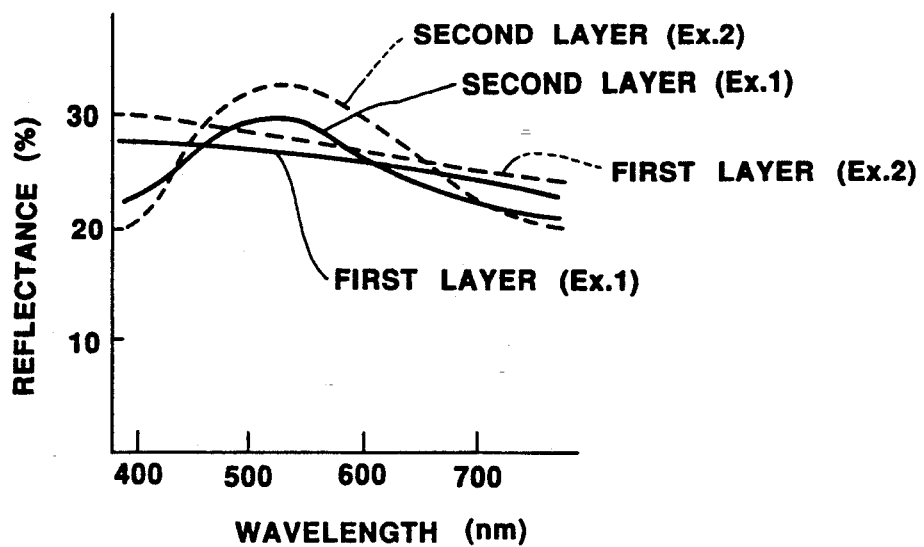
FIG. 3 is a graph showing the relationship between wavelength of incident light and reflectance with respect to first and second reflection layers of the combiner.

Reflectance of the first and second oxide layers 18a and 18b was determined with using light rays of which angle of incidence is about 65°. The results of the relationship between the reflectance and wavelength of incident visible light are shown in FIG. 3. As is seen from FIG. 3, the first oxide layer 18a had a relatively uniform reflectance throughout visible light wavelength spectrum. In contrast, the second oxide layer 18b had a selective reflectance. That is, incident visible light of about 500 nm to about 600 nm wavelength was selectively reflected thereby. Furthermore, with respect to incident light of the above wavelength range, reflectance of the second oxide layer 18b was higher than that of the first oxide layer 18a.

EXAMPLE 2

As will be described in the following, the method of Example 1 was slightly modified in this example.

A mixed alkoxide solution was prepared by mixing titanium methoxide and silicon methoxide in the proportion of 80 to 20 by mol, and by dissolving the mixture in an alcohol. In the solution, the concentration of the total methoxide was adjusted to about 0.45 mol/l, and the viscosity of the solution was adjusted to about 7 cP.

The two-stage coating and heating process of Example 1 was repeated except that a bronzy color glass sheet 14 of 2 mm thickness was immersed in the mixed alkoxide solution and drawn up from the solution at a rate of about 0.5 mm/sec. so as to form a first alkoxide sol film on the glass sheet 14, and that the glass sheet 14 was immersed in the solution and drawn up from the solution at a rate of about 5 mm/sec. so as to form a second alkoxide sol film on a first gel film. After that, the heat bending of the bronzy color glass sheet 14 and a clear glass sheet 16 of 2 mm thickness, and the lamination of the bent glass sheets 14 and 16 were carried out in the same manner as in Example 1.

In this example, the thus obtained first layer 18a of the reflection coating 18 was a $TiO_2$-$SiO_2$ mixed oxide film which was about 50 nm in thickness and had a refractive index of about 2.05. The thus obtained second layer 18b of the reflection coating 18 was a TiO$_2$-SiO$_2$ mixed oxide film which was about 165 nm in thickness and had a refractive index of about 2.05.

Reflectance of the first and second oxide layers 18a and 18b was determined with using light rays of which angle of incidence is about 65°. The results of the relationship between the reflectance and wavelength of incident visible light are shown in FIG. 3. It is understood that the results of this example are substantially similar to those of Example 1.

What is claimed is:

1. A head-up display system including an element formed on a transparent substrate for projecting light rays carrying images of display information onto the element from a luminous image source, the element comprising:

a first reflection layer which is directly attached to the transparent substrate and onto which the light rays are to be projected, said first reflection layer having a certain reflection characteristic in terms of wavelength of the light rays; and a second reflection layer which is directly formed on said first reflection layer and onto which the light rays are to be projected, said second reflection layer having another certain reflection characteristic in terms of wavelength of the light rays, wherein the light rays are relatively uniformly reflected by said first reflection layer throughout a visible light wavelength spectrum and selectively reflected, so that the light rays are primarily reflected in a narrow range of said visible light wavelength spectrum, by said second reflection layer, said narrow range extending from about 500 nm to about 600 nm.

2. A head-up display system according to claim 1, wherein said first and second reflection layers are transparent oxide films.

3. A head-up display system according to claim 2, wherein each of said first and second reflection layers is one of a binary oxide film formed of TiO$_2$ and SiO$_2$ and a binary oxide film formed of ZrO$_2$ and SiO$_2$.

4. A head-up display system according to claim 1, wherein the transparent substrate is a laminated glass pane.

5. A head-up display system according to claim 4, wherein the laminated glass pane comprises a color glass sheet.

6. A head-up display system according to claim 1, wherein, with respect to the light rays of wavelengths in the range from 500 nm to 600 nm, reflectance of said second reflection layer is higher than that of said first reflection layer so as to display the images more markedly on the second reflection layer than on the first reflection layer.

7. A head-up display system according to claim 1, wherein a major surface of said first reflection layer is larger than that of said second reflection layer.

8. A head-up display system according to claim 1, wherein said second reflection layer is larger than said first reflection layer in thickness.

9. A head-up display system according to claim 1, wherein said transparent substrate is an automobile front windshield.

10. A head-up display system according to claim 6, wherein the light rays have wavelengths in the range from about 500 nm to about 600 nm.

* * * * *